United States Patent

[11] 3,607,009

[72] Inventor Wayne Thomas Hess
 Memphis, Tenn.
[21] Appl. No. 864,237
[22] Filed July 7, 1969
[45] Patented Sept. 21, 1971
[73] Assignee E. I. du Pont de Nemours and Company
 Wilmington, Del.
 Continuation-in-part of application Ser. No.
 767,063, Oct. 10, 1968, now abandoned.

[54] PROCESS FOR THE PREPARATION OF COPPER CYANIDE
 10 Claims, 2 Drawing Figs.
[52] U.S. Cl. .................................................. 23/79,
 23/97, 23/285
[51] Int. Cl. .................................................. C01c 3/08,
 C01g 3/04, B01j 1/00
[50] Field of Search ........................................ 23/79, 97,
 154

[56] References Cited
 UNITED STATES PATENTS
 2,049,402 7/1936 Wernlund .................... 23/97
 2,586,579 2/1952 Supiro ........................ 23/97
 2,987,378 6/1961 Thoma ........................ 23/97
 FOREIGN PATENTS
 1,015,415 9/1957 Germany .................... 23/79
Primary Examiner—Oscar R. Vertiz
Assistant Examiner—Hoke S. Miller
Attorney—Robert W. Black ABSTRACT: Copper cyanide (CuCN) is produced from copper metal and hydrogen cyanide wherein the copper is reacted with cupric chloride to form cuprous chloride in an aqueous solution containing an alkali metal or alkaline earth metal chloride and hydrochloric acid. The cuprous chloride is reacted with hydrogen cyanide to form cuprous cyanide and hydrochloric acid. The insoluble cuprous cyanide is separated from the solution. The cuprous chloride in the remaining portion of solution is oxidized to cupric chloride by the action of air or oxygen, and the hydrochloric acid which is then reacted with more copper.

LEGEND
- ○ = AIR AT 1 ATM. & 2 L/MIN. FLOW SOLUTION 41-42°C
- □ = $O_2$ AT 1 ATM. & 2 L/MIN. FLOW SOLUTION 38°C
- ▽ = AIR AT 1 ATM. & 4 L/MIN. FLOW SOLUTION 40°C
- ◇ = AIR AT 2 ATM. & 2 L/MIN. FLOW SOLUTION 40°C

INVENTOR
WAYNE THOMAS HESS

BY *Robert W. Black*

ATTORNEY

PROCESS FOR THE PREPARATION OF COPPER CYANIDE

CROSS REFERENCE TO RELATED APPLICATIONS

This application is a continuation-in-part of pending applicatio.. Ser. No. 767,063, filed on Oct. 10, 1968, now abandoned.

BACKGROUND OF INVENTION

1. Field of Invention

This invention relates to the preparation of copper cyanide.

2. Prior Art

Heretofore, copper cyanide has been manufactured from copper, chlorine and sodium cyanide as raw materials with sodium chloride as a waste byproduct. This is an old, batchwise process which requires high ratios of labor per unit of finished product, high raw materials cost, disposal of a waste byproduct and the need for a purge stream. The process can be described by the following reactions:

1. $2 CuCl + Cl_2 \xrightarrow{brine} 2 CuCl_2$
2. $2 CuCl_2 + 2 Cu \rightarrow 4 CuCl$
3. $2 CuCl + 2 NaCN \rightarrow 2 CuCN + 2 NaCl$ 1-3. $2 Cu + Cl_2 + 2 NaCN \rightarrow 2 CuCN + 2 NaCl$

SUMMARY OF INVENTION

According to the present invention there is provided a process for the preparation of cuprous cyanide comprising reacting copper with cupric chloride which is dissolved in an aqueous solution containing about 10 to 30 percent by weight of an alkali metal or alkaline earth metal chloride, and about 1 to 5 percent by weight hydrochloric acid to form cuprous chloride; reacting a portion of the cuprous chloride of the solution with hydrogen cyanide at a temperature and at a pressure sufficient to keep the hydrogen cyanide liquid, to form cuprous cyanide and hydrochloric acid; separating the insoluble cuprous cyanide from the solution; and oxidizing the remaining portion cuprous chloride to cupric chloride for reaction with more copper.

DETAILED DESCRIPTION OF INVENTION

Figure 1:
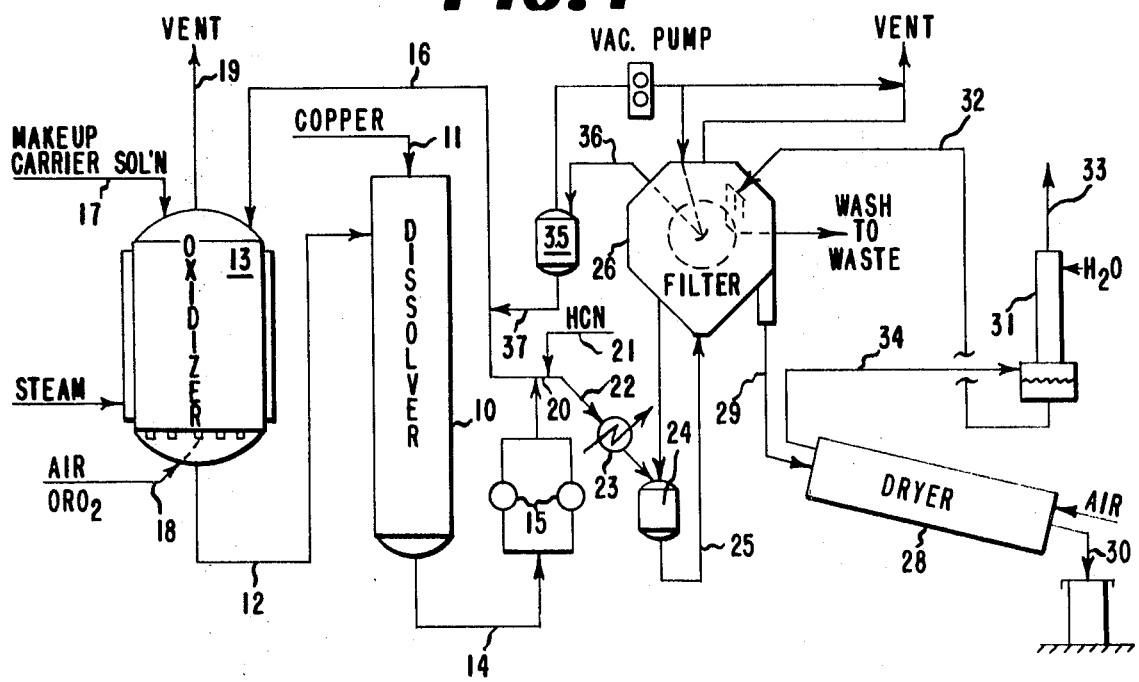
FIG. 1 diagrammatically shows the process for preparing copper cyanide.

The present invention prepares cuprous cyanide directly from hydrogen cyanide, copper and oxygen, eliminates old process raw materials cost and regenerates hydrochloric acid which is recycled according to the following reactions:

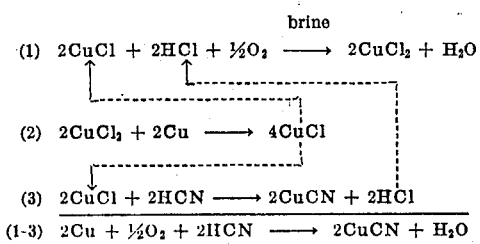

With reference to the drawing showing the preferred process, copper metal is introduced into the top of a dissolver 10 through line 11 where it is reacted with cupric chloride dissolved in an aqueous carrier solution of sodium chloride and hydrochloric acid which is introduced into dissolver 10 through line 12 from oxidizer 13 to form cuprous chloride. The cuprous chloride solution exits dissolver 10 through line 14, passes through a filter 15 which separates undissolved particulate copper and foreign matter and then one-half of the solution is fed back to oxidizer 13 through line 16.

A makeup carrier solution comprising hydrochloric acid, sodium chloride and water is fed into the top of oxidizer 13 through line 17 while air is fed into the bottom through line 18. The oxidizer is jacketed so it can be steam heated and is provided with vent line 19 to remove hydrogen and nitrogen and other inerts from the air and other gases such as water vapor and minor amounts of hydrogen chloride from the system. The cupric chloride formed plus carrier solution is fed to dissolver 10 through line 12.

The second-half of cuprous chloride solution from filter 15 in line 20 is mixed with liquid hydrogen cyanide from line 21 to form solid cuprous cyanide and regenerate the hydrochloric acid. The reaction product in line 22 is passed through cooler 23 to a vented filter feed tank 24, where it is pumped through line 25 to a rotary vacuum filter 26.

Filtered and washed cuprous cyanide is passed to dryer 28 through line 29, where it is air dried, and exits as final product through line 30. The moist drying air and any other waste gases including trace amounts of HCl, HCN and entrained particulate cuprous cyanide from dryer 28 passes to scrubber 31 through line 34, where the HCl, HCN and cuprous cyanide are removed by scrubbing with water and returned to filter 26 through line 32 for washing the cuprous cyanide filter cake to free it of the carrier solution. Air and water are vented to the atmosphere through line 33.

The filtrate from filter 26, which now contains the regenerated hydrochloric acid, passes filtrate tank 35 through line 36, from which it is pumped into line 16 through line 37 to be recycled to oxidizer 13.

As an alternate to the brine-hydrochloric acid carrier solution, a 10–20 hydrochloric acid solution can be used at elevated temperature. However, due to the corrosive problems involved in using hot, strong hydrochloric acid solutions, a brine carrier solution is preferred. A brine of an alkali metal or alkaline earth metal chloride will solubilize cuprous chloride and, therefore, the amount of hydrochloric acid in the solution can be reduced to that required for oxidation of the cuprous chloride. Since the alkali metal or alkaline earth metal chloride salts are quite soluble, lower temperatures such as in the range of 10° to 80° C. can be used in the oxidizer 13, thus reducing hydrochloric acid vent losses and steam consumption. The preferred salt is sodium chloride. A typical carrier solution will contain about 10–30 by weight sodium chloride, 1–5 percent by weight hydrochloric acid, with the balance water. The preferred starting carrier solution contains about 20 percent sodium chloride and 2–3 percent hydrochloric acid. This solution contains more than sufficient chloride ion to solubilize 10–11 percent cuprous chloride in the 30°–60° C. temperature range and also to provide for up to 50 percent conversion of the cuprous chloride to cupric chloride in the oxidation step. Although alkaline earth metal chlorides such as calcium chloride will readily solubilize cuprous chloride, they are not preferred due to difficulties encountered during oxidation of the cuprous chloride to cupric chloride.

The oxidation step is dependent on several factors; however, at constant temperature and concentrations the controlling factors are the residual cuprous ion concentration of the solution and the partial pressure of oxygen in the oxidizing gas stream. The mass transfer rate of oxygen into the solution at given solution concentration and temperature was found to be directly dependent on the residual cuprous on concentration of the solution and independent of the flow rate of the oxidizing gas stream. At constant residual cuprous ion concentration, the mass transfer rate (K) was found to be a constant when expressed in terms of the moles of oxygen transferred into the solution per unit per unit volume of solution per atmospheres of oxygen available. Typical values of the mass transfer rate coefficient at various residual cuprous ion concentrations into the previously described solution containing about 0.074 lb. mole/ft.³ of total copper at 40° C. are:

| Residual [Cu⁺] | K |
|---|---|
| (Lb. mole/ft.³) | (Lb. mole O₂/Hr./ft.³/Atm. O₂) |
| 0.03 | 0.0070 |
| 0.04 | 0.0088 |
| 0.05 | 0.0110 |
| 0.06 | 0.0144 |
| 0.07 | 0.0160 |

The oxidation of the solution can be carried to completion on a batch basis. However, the rate of oxidation becomes so small that it is commercially impractical to carry the reaction to completion for a continuous recycle process. The above-listed typical data represent conversions of cuprous ion to cupric ion in the range of 5-60 percent. The preferred range is 20-50 percent conversion.

In the reduction step, metallic copper is dissolved in the solution according to the following reaction:

$$Cu° + CuCl_2 \xrightarrow{HCl, Brine} 2\, CuCl$$

Complete reduction of the cupric chloride to cuprous chloride is necessary prior to the addition of the HCN to precipitate cuprous cyanide. If this is not done, destruction of some of the HCN could result from the action of free chlorine. In continuous operations, the oxidized solution is fed into the top of a tower containing the copper metal and cuprous chloride solution is removed from the bottom of the tower. The color of the feed stream varies from bright green for a solution containing all cupric chloride to various shades of dark brown for partially oxidized solutions. A solution containing all cuprous chloride from the dissolver is water clear. The preferred operating condition for the dissolver is 30°-60° C. at atmospheric pressure. Copper is added continuously to the tower in sufficient quantity to maintain a constant concentration of copper in the cuprous chloride solution. Addition of a small bleed of nitrogen into the base of the tower will improve the copper solution rate per cubic foot of tower by about 40 percent. Agitation and deaeration are accomplished by the nitrogen bleed.

Cuprous cyanide is precipitated by the direct addition of liquid hydrogen cyanide to the solution of cuprous chloride in brine and hydrochloric acid. Temperature-pressure relationships of the hydrogen cyanide must be satisfied to keep the hydrogen cyanide in liquid form. At atmospheric pressure, the temperature should be under 25° C. (below the boiling point of hydrogen cyanide) while for a system operating at higher temperatures, i.e., up to 60° C., the hydrogen cyanide must be fed into the solution under pressure such to keep the hydrogen cyanide liquid. Temperatures lower than 25° C. can be used, but more dilute solutions and larger equipment is required.

The liquid hydrogen cyanide can be reacted with the cuprous chloride in the solution in various ways other than the preferred process where it is reacted with the cuprous chloride in one-half the reduced solution. For instance, the solution can be split into two streams of proportional cuprous chloride content within the range of about 25-75 percent. Either the hydrogen cyanide can be reacted with the cuprous chloride from 25 percent of the solution with the remaining 75 percent recycled for oxidation or can be reacted with the cuprous chloride from 75 percent of the solution with the remaining 25 percent recycled for oxidation. The important consideration is that, regardless of the amount of solution taken out for reaction with liquid hydrogen cyanide, the copper balance must be maintained. It should, of course, be obvious that in stopping the process, 100 percent of the solution will be used to react the cuprous chloride with hydrogen cyanide while, in starting up the process, the solution builds its cuprous chloride content up from 0 percent.

Another method which can be used is to add just enough liquid hydrogen cyanide to the solution to react with a portion (i.e., one-half) of the cuprous chloride present. In this case, the filtrate is recycled to the oxidizer. However, this process increases the cuprous cyanide separation problems due to required larger filtration equipment.

The invention can be further understood by the following example wherein parts and percentages are by weight unless otherwise indicated.

EXAMPLE I

A. OXIDATION REACTION
1. Air at atmospheric pressure

Into a glass gas washing bottle fitted with a glass frit at the bottom was added 500 g. of 3 percent hydrochloric acid, 125 g. of NaCl and 61.25 g. of CuCl. Air was introduced below the frit at a rate of 2 liters/min. The solution temperature was maintained at 41°-42° C. by a water bath. Samples were removed from the apparatus at 11 minute intervals and analyzed for total copper (Cu) and cupric copper (Cu⁺⁺). Results were as follows:

| TIME | Cu | Cu⁺⁺ |
|---|---|---|
| 0 | 5.73% | 0.44% |
| 11 min. | 5.75% | 0.72% |
| 22 min. | 5.77% | 0.99% |
| 33 min. | 5.78% | 1.17% |
| 44 min. | 5.81% | 1.33% |
| 55 min. | 5.83% | 1.49% |
| 66 min. | 5.85% | 1.63% |

Figure 2:
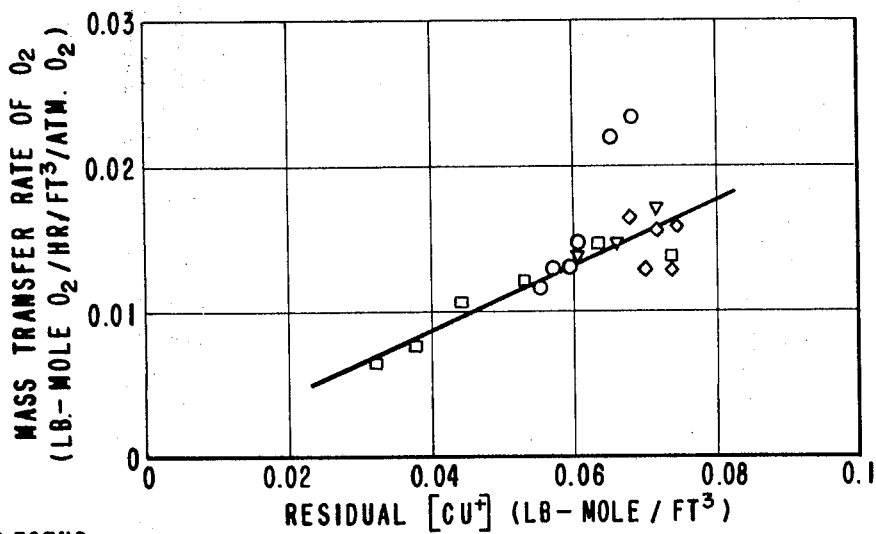
FIG. 2 is a graph showing oxygen mass transfer rates as a function of residual cuprous copper concentration.

These data when converted to mass transfer units represents a range of 0.0177-0.02335 lb. mole O₂/hr.ft.³ of solution/atm. O₂. A plot of the mass transfer rates determined versus the residual concentration of cuprous copper is shown in FIG. 2

2. Air at atmospheric pressure

Into a glass washing bottle fitted with a glass frit at the bottom was added 500 g. of 3 percent hydrochloric acid, 125 g. of NaCl and 65.2 g. of CuCl. Air was introduced below the frit at a rate of 4 liters/min. The solution temperature was maintained at 40° C. by a water bath. Samples were removed from the apparatus at 11 minute intervals and analyzed for total copper (Cu) and cupric copper (Cu⁺⁺). Results were as follows:

| TIME | Cu | Cu⁺⁺ |
|---|---|---|
| 0 | 6.09% | 0.55% |
| 11 min. | 6.09% | 0.76% |
| 22 min. | 6.11% | 0.95% |
| 33 min. | 6.12% | 1.24% |
| 44 min. | 6.13% | 1.29% |
| 55 min. | 6.13% | 1.44% |
| 66 min. | 6.14% | 1.63% |

These data when converted to mass transfer units represent a range of 0.012-0.017 lb. mole O₂/hr./ft.³ of solution/atm. O₂. A plot of the mass transfer rates determined versus the residual concentration of cuprous copper present is shown in FIG. 2.

3. Oxygen at atmospheric pressure

Into the above-described apparatus was added 500 g. of 3 hydrochloric acid, 125 g. NaCl and 67.5 g. of CuCl. Pure oxygen was introduced as in example I-A-1 and 2 at a rate of 2 liters/min. The solution temperature was maintained at 38° C. by a water bath. Samples were removed from the apparatus at 11 minute intervals and analyzed for total copper (Cu) and cupric copper (Cu⁺⁺. Results were as follows:

| Time, minutes | Cu, percent | Cu++, percent |
|---|---|---|
| 0 | 6.30 | 0.24 |
| 11 | No analyses | 1.02 |
| 22 | do | 1.86 |
| 33 | do | 2.56 |
| 44 | do | 3.17 |
| 55 | do | 3.62 |
| 66 | 6.27 | 3.98 |

These data when converted to mass transfer units represent a range of 0.0065–0.0147 lb. mole $O_2$/hr./ft.$^3$ of solution/atm. $O_2$. A plot of the mass transfer rates determined versus the residual concentration of cuprous copper present is shown in FIG. 2.

B. REDUCTION REACTION

1 Into a glass reaction pot fitted with a bottom outlet constant level overflow loop was added 1,334 g. of metallic copper with an external surface area of 2.33 ft.$^2$. The reaction pot was filled to the overflow point (366 ml.) with partially oxidized solution prepared as per example I-A-1 (Oxidation). The initial solution contained 5.78 percent total copper and 1.62 percent cupric copper. The entire reaction pot was immersed in a water bath to hold the temperature at 50° C. The system was purged with nitrogen to prevent admission of oxygen from the atmosphere. When the solution in the reaction pot was water clear, additional solution as described above was added at a rate of 12.0 ml./min. After 809 ml. of additional solution had been added, the overflow was sampled and analyzed for cupric copper content. Results were negative. The solution was completely reduced. Although not limiting, the dissolution rate was 2.3 lbs./hr./ft.$^3$ of solution.

2. Using the same apparatus as above and same feed solution, the reaction pot was filled and the solution permitted to become water clear. The temperature of the bath was now controlled at 45° C. Feed solution was started to the reaction pot at a rate of 22.5 ml./min. After 230 ml. of additional solution was added the overflow solution was slightly discolored, indicating incomplete reduction of cupric chloride. No noticeable increase in color level was noted throughout the remainder of the test. After 891 ml. of solution had been fed, the overflow was sampled and found to contain 0.27 percent $Cu^{++}$. At this flow rate 83.4 percent of the $Cu^{++}$ had been reduced. The rate of dissolution was 3.2 lbs./hr./ft.$^3$ of solution.

3. Using the same apparatus as above altered only so as to introduce a slight purge of nitrogen through a glass frit near the bottom of the reaction pot, the reaction pot was filled and the solution permitted to become water clear. The feed solution for this test contained 6.50 percent total copper and 2.16 percent cupric copper. The temperature was maintained at 40° C. Feed solution was started to the reaction pot at a rate of 18.7 ml./min. After addition of 1661 ml. of solution, the overflow was sampled and found to contain 0.07 $Cu^{++}$. The rate of dissolution was 4.6 lbs./hr./ft.$^3$ of solution and 96.8 percent of the $Cu^{++}$ was reduced.

4 Using same apparatus as in example I-B-3, the reaction pot was filled and the solution permitted to become water clear. The feed solution for this test contained 6.52 percent total copper and 2.45 percent cupric copper. The temperature was maintained at 40° C. Feed solution was started to the reaction pot at a rate of 15.9 ml./min. After 1,786 ml. of solution had been fed, the overflow solution was sampled and found to contain 0.05 $Cu^{++}$. The rate of dissolution was 4.5 lbs./hr./ft.$^3$ of solution and 98 percent of the $Cu^{++}$ was reduced.

C CUPROUS CYANIDE PRECIPITATION

1 Into an Erlenmeyer flask was added 100 gms. of solution containing 9.0 percent CuCl, 1.5 percent HCl, 18.0 percent NaCl, balance water. Agitation was provided by a "Teflon" (polytetrafluoroethylene) coated magnetic stirrer. The temperature was 24° C. Into this agitating solution was added 3.6 ml. (2.466 gms.) of liquid HCN.

Immediately a precipitate of cuprous cyanide was formed. The resultant slurry was filtered and a sample of the filtrate was set aside for analysis. The precipitate was washed with deionized water and the wet cake was placed into a vacuum over at 90° C. for drying. The initial precipitate was white, but upon drying overnight discolored to a very light tan color. The recovered precipitate weighted 7.92 gms.

| Analyses | %Cu | %CN, |
|---|---|---|
| CuCN | 70.86 | |
| Filtrate | 0.08 | 0.023 |

| Mass Balance | % of Initial |
|---|---|
| HCN accounted for: 2.4077 g. | 97.7 |
| Cu accounted for: 5.6955 g. | 98.4 |

2. In order to better define the stability of cuprous cyanide in the hydrochloric acid medium, the solubility of cuprous cyanide was determined in 5 percent, 10 percent and 15 percent hydrochloric acid solution at 25° C., 50° C. and 70° C. Results were:

| | Temp. | Cu in Solution | CN, in Solution |
|---|---|---|---|
| 0.5% HCl | 25° C | 0.092% | 0.026% |
| 10% HCl | 25° C | 0.406% | 0.157% |
| 15% HCl | 25° C | 1.22% | 0.157% |
| 0.5% HCl | 50° C | 0.19% | 0.062% |
| 10% HCl | 50° C | 0.92% | 0.29% |
| 15% HCl | 50° C | 2.56% | 0.70% |
| 0.5% HCl | 70° C | 0.52% | 0.07% |
| 10% HCl | 70° C | 1.50% | 0.54% |
| 15% HCl | 70° C | 3.84% | 1.05% |

Using the preferred carrier solution disclosed herein, the concentration of hydrochloric acid in the precipitating step will be 5 percent or less. Therefore, yields shown in example I-C-1 should be typical for the disclosed process using preferred solutions and conditions.

I claim:

1. A process for the preparation of cuprous cyanide comprising: reacting copper with cupric chloride which is dissolved in an aqueous solution containing about 10 to 30 percent by weight of an alkali metal or alkaline earth metal chloride, and about 1 to 5 percent by weight hydrochloric acid to form cuprous chloride; reacting a portion of the cuprous chloride of the solution with hydrogen cyanide at a temperature and at a pressure sufficient to keep the hydrogen cyanide liquid, to form cuprous cyanide and hydrochloric acid; separating the insoluble cuprous cyanide from the solution; and oxidizing the remaining portion of cuprous chloride to cupric chloride for reaction with more copper.

2. The process of claim 1 wherein about 25 to 75 percent of the cuprous chloride is reacted with hydrogen cyanide to form cuprous cyanide and hydrochloric acid and the remaining 75 to 25 percent of the cuprous chloride is recycled with the solution from the cuprous cyanide separation for oxidation.

3. The process of claim 2 wherein the metal chloride is sodium chloride.

4. The process of claim 2 wherein the separated cuprous cyanide is dried.

5. The process of claim 2 wherein the process is maintained at a temperature between about 10 and 80° c.

6. The process of claim 2 wherein the reaction of hydrogen cyanide and cuprous chloride is carried out by adding liquid hydrogen cyanide at atmospheric pressure and a temperature below the boiling point of liquid hydrogen cyanide at atmospheric pressure.

7. The process of claim 2 wherein the reaction of hydrogen cyanide and cuprous chloride is carried out by adding liquid hydrogen cyanide at a temperature within the range of 40 to 50° C. and at a pressure sufficient to keep the hydrogen cyanide in liquid form.

8. The process of claim 2 wherein oxidation is conducted by an oxidizing gas stream of air, enriched air or oxygen.

9. A process for the preparation of cuprous cyanide comprising: reacting copper with cupric chloride which is dissolved in an aqueous solution containing about 10 to 30 by weight sodium chloride and about 1 to 5 percent by weight sodium chloride and about 1 to 5 by weight hydrochloric acid at atmospheric pressure a temperature of 30° to 60°C. to form cuprous chloride; adding liquid hydrogen cyanide to one-half of the solution and reacting cuprous chloride therein with the hydrogen cyanide at a temperature of about 40° to 50° C. and a pressure sufficient to keep the hydrogen cyanide liquid; to form cuprous cyanide and hydrochloric acid; separating the insoluble cuprous cyanide from the solution; combining the solution from the cuprous cyanide separation with the second half of the solution and oxidizing the cuprous chloride with a gas stream of air, enriched air or oxygen to cupric chloride at a temperature of about 10° to 80° C. and at up to 1 atmosphere oxygen partial pressure.

10. The process of claim 9 wherein the reaction of copper and cupric chloride is conducted in a nitrogen atmosphere.

PO-1050
(5/69)

UNITED STATES PATENT OFFICE
CERTIFICATE OF CORRECTION

Patent No. 3,607,009          Dated September 21, 1971

Inventor(s) Wayne Thomas Hess

It is certified that error appears in the above-identified patent and that said Letters Patent are hereby corrected as shown below:

Column 7, line 17 after "30" the word -- percent -- should be inserted.

Column 8, line 2, delete "sodium chloride and about 1 to 5 by weight"; line 3, after "pressure" the word -- and -- should be inserted.

Signed and sealed this 7th day of March 1972.

(SEAL)
Attest:

EDWARD M. FLETCHER, JR.          ROBERT GOTTSCHALK
Attesting Officer          Commissioner of Patents